March 2, 1971  R. C. HARRISON  3,567,789
PROCESS FOR THE PRODUCTION OF BIS(CYCLOALKENYL)-SUBSTITUTED
OLEFINS
Filed Nov. 10, 1969

INVENTOR.
R. C. HARRISON

BY Young & Quigg

ATTORNEYS 3,567,789
PROCESS FOR THE PRODUCTION OF BIS(CYCLO-
ALKENYL)-SUBSTITUTED OLEFINS
Roy C. Harrison, Bartlesville, Okla., assignor to Phillips
Petroleum Company
Filed Nov. 10, 1969, Ser. No. 875,362
Int. Cl. C07c 5/00
U.S. Cl. 260—666                                    11 Claims

ABSTRACT OF THE DISCLOSURE

Bis(cycloalkenyl)-substituted olefins are prepared from alkenyl-substituted alkenes in a process where the feedstock and the raw product are simultaneously treated in a single fractionating vessel.

---

Figure 1:
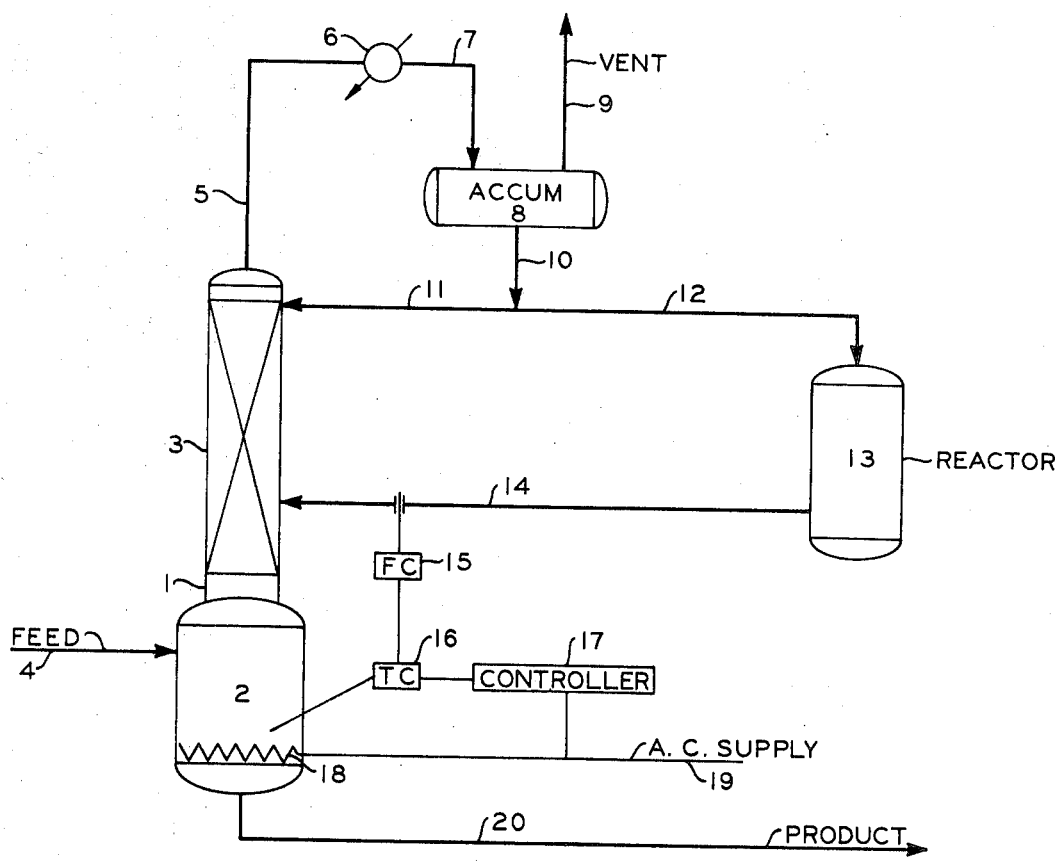

This invention relates to an improved method for synthesizing bis(cycloalkenyl)-substituted olefins.

It is known in the art to synthesize bis(cycloalkenyl)-substituted olefins from alkenyl-substituted alkenes.

It now has been found that counter-current treatment of the feed with the product in a fractionating zone vaporizes and purifies the feed. The bis(cycloalkenyl)-substituted olefins tend to decompose at elevated temperatures above their boiling point, such as could be found near heaters in a kettle. Dilution with alkenyl-substituted cycloalkenes in the fractionating zone avoids such decomposition by lowering the boil-up temperature of the fractionating zone.

Counter-current treatment of the feed with the product also provides for concentration of the latter. Feed purification and product concentration in a single vessel in such a manner also provides a controlled rate of feed vaporization generation and a method for recycling unreacted feed to the disproportionation reactor.

Accordingly, it is an object of this invention to provide an improved method for synthesizing bis(cycloalkenyl)-substituted olefins.

Another object of this invention is to provide a method for purifying and vaporizing the alkenyl-substituted alkene feed.

Other objects, advantages, and aspects of this invention will become apparent to one skilled in the art upon consideration of the accompanying disclosure and drawing which is a simplified flow diagram of one embodiment of the invention.

According to the process of this invention, bis(cycloalkenyl)- substituted olefins are prepared by contacting alkenyl-substituted cycloalkenes with an effective catalytic amount of a disproportionation catalyst under conditions of temperature and pressures sufficient to form the olefin. It has now been found that this process is improved by treating the reaction effluent containing unreacted alkenyl-substituted cycloalkenes with additional alkenyl-substituted cycloalkenes in a fractionating zone under conditions of temperature and pressure sufficient to vaporize a substantial portion of the alkenyl-substituted alkenes. The alkenyl-substituted cycloalkenes are then recovered as overhead product from the fractionating zone and the bis(cycloalkenyl)-substituted olefins are recovered as bottoms product from the fractionating zone. The overhead product then can be fed to the disproportionation reactor.

While the accompanying drawing discloses the alkenyl-substituted cycloalkene feed being charged directly into the fractionating zone, it is to be understood that the feed can be charged to various zones in the process. For example, the feed can be charged directly into overhead product line 5 from the fractionating zone provided some of the overhead is refluxed, or directly into the reaction mixture (line 14) prior to the fractionating zone.

The reaction effluent as it comes from the disproportionation reaction comprises bis(cycloalkenyl)-substituted olefins and unreacted alkenyl-substituted cycloalkenes. Generally, the reaction effluent comprises about 20 percent product and about 80 percent unreacted feed.

The bottoms product of the fractionating zone consists essentially of bis(cycloalkenyl)-substituted olefins and impurities from the feed. The recovered bottoms product can be fractionated further if a high purity product is desired.

The overhead product from the fractionating zone comprises alkenyl-substituted cycloalkenes, ethylene and other light materials. The ethylene and other light materials can be vented or removed from the overhead product.

The process in which the invention is an improvement is known in the art. For example, see U.S. Pat. 3,463,828, issued on Aug. 26, 1969.

The alkenyl-substituted cycloalkenes which are converted to bis(cycloalkenyl)-substituted olefins are represented by the formula:

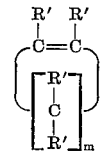

wherein one, and only one R' in the molecule is:

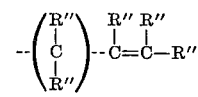

and wherein the remaining R's are selected from the group consisting of hydrogen and alkyl, aryl and cycloalkyl radicals and combinations thereof such as aralkyl and alkaryl containing from 1 to 10 carbon atoms, wherein R" is selected from the group consisting of hydrogen and alkyl, aryl and cycloalkyl radicals and combinations thereof such as aralky and alkaryl containing from 1 to 10 carbon atoms, wherein each R" in the molecule can be alike or different, wherein $m$ is an integer from 3 to 10, inclusive, wherein $n$ is an integer from 0 to 4, inclusive, and wherein the total carbon atoms in one of said alkenyl-substituted cycloalkenes does not exceed 20. The preferred alkenyl-substituted cycloalkenes are those containing 6-membered rings, those which are non-conjugated and those whose alkenyl radical contains no branching at a carbon atom joined by double bonds.

Some specific examples of alkenyl-substituted alkenes which can be converted to bis(cycloalkenyl)-substituted olefins by the process of this invention are 3-vinylcyclopentene, 4-vinylcyclohexene, 2,3-dimethyl-4-vinylcyclohexene, 4 - allylcyclooctene, 4 - (3 - butenyl)cyclodecene, 2 - phenyl-6-(3-cyclohexene-1-yl)hexene-1,3-cyclohexenyl-4-vinylcyclohexene, 3-benzyl-4-(1-methylvinyl)cyclohexene, 4-(1-octenyl)cyclododecene, 5,5-diethyl-4-vinylcyclodecene, 4-(1-cyclohexene - 1 - yl)-3,3-dimethylbutene-1,1- methyl-4-(1-methylvinyl)cyclohexene, 3-methyl-5-(propenyl)cyclohexene, 3-methyl-4-(propenyl)cyclohexene, 3,4-dimethyl-5-vinylcyclohexene, 3,5-dimethyl-4-vinylcyclohexene, and the like, and mixtures thereof.

Examples of bis(cycloalkenyl)-substituted olefin products which are produced by this invention are characterized by the formula:

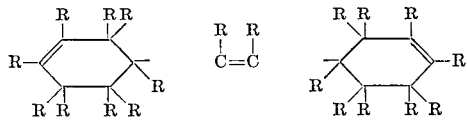

wherein R has at least one member selected from the group consisting of hydrogen, alkyl, aryl, cycloalkyl, aralkyl, alkaryl containing from one to ten carbon atoms wherein the total carbon atoms does not exceed 20.

Some specific examples are as follows:
1,2-bis(2-cyclopentene-1-yl)-ethylene,
1,2-bis(3-cyclohexene-1-yl)ethylene,
1,2-bis(2,3-dimethyl-3-cyclohexene-1-yl)ethylene,
1,4-bis(3-cyclooctene-1-yl)butene-2,
1,6-(3-cyclodecene-1-yl)hexene-3,
5,6-diphenyl-1,
10-bis(3-cyclohexene-1-yl)decene-5,
1,2-bis(2-cyclohexyl-3-cyclohexene-1-yl)ethylene,
2,3-bis(2-benzyl-3-cyclohexene-1-yl)butene-2,
1,2-bis(3-cyclodecene-1-yl)ethylene,
1,2-bis(1,1-dimethyl-cyclodecene-1-yl)ethylene,
2,5-dimethyl-1,6-bis(1-cyclohexene-1-yl)hexene-3,
2,3-bis(4-methyl-3-cyclohexene-1-yl)butene-2,
1,2-bis(3-methyl-4-cyclohexene-1-yl)ethylene,
1,2-bis(2-methyl-3-cyclohexene-1-yl)ethylene,
1,2-bis(2,3-dimethyl-4-cyclohexene-1-yl)ethylene,
1,2-bis(2,6-dimethyl-3-cyclohexene-1-yl)ethylene,
1-methyl-1-(4-methyl-3-cyclohexene-1-yl)-2-(3-cyclohexene-1-yl)ethylene.

The catalysts which are employed in the disproportionation process of this invention are conventionally supported molybdenum or tungsten catalysts; suitable supports include silica, alumina and aluminum-containing compositions which contain minor amounts of other materials which are compatible with the reaction, such as small amounts of silica, titania, magnesia, cobalt oxide, and the like. The molybdenum or tungsten can be added to support as a molybdenum or tungsten compound; for example, molybdenum hexacarbonyl, tungsten hexacarbonyl, ammonium tungstate, molybdenum oxide, tungsten oxide, or molybdenum and tungsten materials convertible to the oxide on calcination can be used. Addition of the molybdenum or tungsten compound to the base can be carried out by such conventional methods as dry mixing, coprecipitation or impregnation. Impregnation is presently preferred. The amount of molybdenum or tungsten present in the resulting positive catalyst, calculated as the oxide, will generally range from 0.1 to 30 weight percent, preferably 3 to 15 weight percent by weight of the total catalyst composition. Presently preferred are catalysts prepared by associating a molybdenum with alumina together with a small amount of an alkali metal compound.

A more complete understanding of the invention can be had by reference to the accompanying drawings which diagrammatically illustrate a preferred embodiment of the invention.

Referring to the drawings, FIG. 1, a fractionating zone 1 is provided with a kettle 2 and a column 3 for effecting the reaction product-feed contacting. Feed line 4 connects with the kettle 2 for introducing feed to the kettle at a desired rate. An overhead vapor line 5 connects the top of column 3 with condenser 6. Line 7 connects condenser 6 with accumulator 8, which is provided with vent 9. Line 10 connects accumulator 8 with reflux line 11 and line 12. Line 11 connects line 10 with column 3 and line 12 connects line 10 with disproportionation reactor 13. Line 14 connects reactor 13 with column 3. Line 14 is provided with a flow controller 15. A temperature controller 16 is sensitive to the temperature of fractionating zone 1 and is operatively connected with flow controller 15. Temperature controller 16 is operatively connected with controller 17 which regulates the amount of heat supplied to heating element 18 by heat supply 19. Bottoms product line 20 connects with the bottom of fractionating zone 1.

Figure 2:
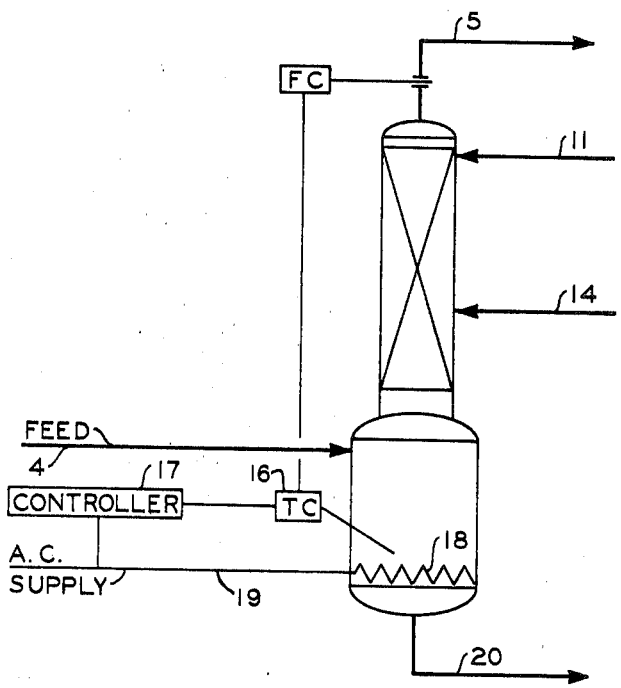

As shown by FIG. 2 of the drawings, line 5 can be provided with flow controller 15 rather than line 14. Also, it is to be understood that reactor 13 can be an upflow reactor as well as a trickle bed reactor.

A specific application of this invention is the conversion of vinylcyclohexene to bis(cyclohexenyl)ethylene. Vinylcyclohexene is charged to kettle 2 through feed line 4. Generally, kettle temperature and pressure are then set at 400° F. and 10 p.s.i.g., respectively. Overhead, vinylcyclohexene, ethylene and other like materials are removed from column 3 through overhead line 5. The overhead products are then passed through condenser 6 to accumulator 8. Ethylene and the other like materials are vented through vent 9 and the vinylcyclohexene passes through line 10. A portion of the vinylcyclohexene is recycled back to column 3 through line 11, while the remaining portion is passed to reactor 13 through line 12. After a portion of the vinylcyclohexene has been converted to bis(cyclohexenyl)ethylene, the reaction mixture of reactor 13 is passed to column 3 through line 14. Crude bis(cyclohexenyl)ethylene is then recovered from kettle 2 through line 20. Temperature controller 16, which senses the temperature of kettle 2, is reset by flow control 15 which in turn regulates the electrical supply 19 to heating element 18 through controller 17.

The temperature of disproportionation reactor 13 usually is maintained at approximately 260° F.

In normal operation when the temperature of kettle 2 reaches 360–380° F., heating element 19 is turned off by temperature control 16 through controller 17. At this time, a fixed amount of crude bis(cyclohexenyl)ethylene is removed from kettle 2 through line 20, while a similar amount of vinylcyclohexene is charged to kettle 2 through feed line 4. Heat is again applied and the cycle is continued until the catalyst activity of reactor 13 becomes low or until the temperature of kettle 2 again reaches 360–380° F. Note, the concentration of bis(cyclohexenyl)ethylene gradually increases until the desired temperatures are reached. The process of this invention can be operated continuously as well as batchwise.

As is apparent, the above-described process allows for the simultaneous treatment of the feedstock and raw conversion product in a single vessel to vaporize a substantial portion of the feed and to concentrate a substantial portion of the raw product. The process of this invention also provides for a uniform rate of feed vapor generation, i.e., the flow rate of feed and reaction product through the system regulates heat input into the fractionating zone.

The method of simultaneously treating feedstock and raw conversion product according to this invention is applicable to the treatment of other bis(cycloalkenyl)-substituted olefins and alkenyl-substituted alkenes. For example, the process of this invention can be employed in the disproportionation of octene-1 to 7-tetradecene and of isobutylene to 2,3-dimethylbutene-2. Thus, while the specific description of the process herein is directed to a specific application of the invention, it is not so limited as will be understood by one skilled in the art.

Flow rates and conditions of operations are now presented as illustrative of the invention and are not to be construed as unnecessarily limiting the same.

EXAMPLE I

In operating in accordance with the invention, in an apparatus substantially as shown in the drawing, then converting vinylcyclohexene to bis(cyclohexenyl)ethylene, the operating conditions and stream contents obtained are set forth as follows.

TABLE I.—Production of Crude BCE

| | Run Number | | | | |
|---|---|---|---|---|---|
| | 1 | 2 | 3 | 4 | 5 |
| Recycle column: | | | | | |
| Max. kettle temp., °F | 380 | 370 | 360 | 360 | 380 |
| Total reaction time, hrs | 36 | 44 | 61 | 56 | 62 |
| Charge to kettle: VCH,[1] lbs | 194 | 283 | 274 | 283 | 331 |
| Liquid products: Crude BCE,[2] lbs | 156.5 | 220.7 | 215.3 | 226.4 | 257.1 |
| BCE, lbs | [3] 111 | [3] 147 | [3] 143 | [4] 54.3 | [4] 73.5 |
| Percent conversion: | | | | | |
| Based on product | 79.3 | 78.8 | 58.5 | 82.5 | 78.7 |
| Based on charge | 82.0 | 71.9 | 48.7 | 73.0 | 71.5 |
| Ultimate yield, mole percent: BCE | 90.5 | 89.0 | 90.7 | 85.0 | 91.5 |

[1] VCH=Vinylcyclohexene.
[2] BCE=Bis(cyclohexenyl)ethylene.
[3] VCH recycle column kettle sample.
[4] Reactor effluent sample.

As demonstrated by the high yields of bis(cyclohexyl) ethylene, satisfactory production of the product was obtained by the disproportionation of 4-vinylcyclohexane according to the process of this invention.

EXAMPLE II

Another run was made according to the procedure of Example I for converting vinylcyclohexene to bis(cyclohexenyl)ethylene. The results are given in Table II.

TABLE II

Production of crude BCE

Recycle column:
Max. kettle temp., °F. _____ 360
Total reaction time, hrs. _____ 203.5
Charge to kettle: VCH, lbs. _____ 243
Liquid products: crude BCE, lbs. _____ 214
BCE, lbs. _____ 103.9
Percent conversion:
Based on product _____ 49
Based on charge _____ 56.2
Ultimate yield, mole percent BCE _____ 87.6

The results clearly demonstrate that high yields of bis(cyclohexenyl)ethylene were obtained according to the process of this invention.

Although this invention has been described in considerable detail, it must be understood that such detail is for the purposes of illustration only and that many variations and modifications can be made by one skilled in the art without departing from the scope and spirit thereof.

I claim:
1. In a method for producing bis(cycloalkenyl)-substituted olefins by contacting in a reaction zone alkenyl-substituted alkenes with an effective catalytic amount of a disproportionation catalyst under conditions of temperature and pressure sufficient to form a reaction effluent containing bis(cycloalkenyl)-substituted olefins, the improvement comprising the steps of:
   (a) treating said reaction effluent and additional alkenyl-substituted cycloalkenes in a fractionating zone under conditions of temperature and pressure sufficient to vaporize a substantial portion of said alkenyl-substituted cycloalkene; and
   (b) removing said alkenyl-substituted alkene as overhead product of said fractionating zone.

2. The process of claim 1 wherein said treating of step (a) concentrates a substantial portion of said bis(cycloalkenyl)-substituted olefins; and
   (c) removing said bis(cycloalkenyl)substituted olefins as bottoms product of said fractionating zone.

3. The process of claim 2 wherein said reaction effluent comprises bis(cycloalkenyl)-substituted olefins and unreacted alkenyl-substituted cycloalkenes, said bottoms product consists essentially of said bis(cycloalkenyl)-substituted olefins, and said overhead product comprises said alkenyl-substituted cycloalkenes.

4. The process of claim 1 wherein said additional alkenyl-substituted cycloalkenes is charged (1) directly to one of said fractionating zones, (2) said overhead product from said fractionating zone to form combined stream, a portion of said combined stream then being refluxed to said fractionation zone, (3) or to said reaction effluent prior to feeding same to said fractionating zone.

5. The process of claim 1 wherein at least a portion of said overhead product is passed to said reaction zone.

6. The process of claim 1 wherein a uniform rate of overhead product removal is maintained by regulating the heat input to said fractionating zone by
   (a) sensing the temperature in said fractionating zone; and
   (b) sensing the flow rate of said reaction mixture to said fractionating zone.

7. The process of claim 1 wherein a uniform rate of overhead product removal is maintained by regulating the heat input to said fractionating zone by:
   (a) sensing the temperature in said fractionating zone; and
   (b) sensing the flow rate of said overhead product from said fractionating zone.

8. The process of claim 1 wherein the temperature of said fractionating zone is not greater than 380° F.

9. The process of claim 1 wherein the temperature of said fractionating zone is not greater than 360° F.

10. The process of claim 1 wherein (a) said alkenyl-substituted cycloalkenes have the formula:

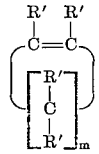

wherein one R' is —CH''CH$_2$, wherein the remaining R's are selected from the group consisting of hydrogen and alkyl radicals containing from 1 to 10 carbon atoms, wherein m is 4, and wherein the total carbon atoms in one of said alkenyl-substituted cycloalkenes does not exceed 20, (b) said disproportionation catalyst is an admixture of one of molybdenum oxide, tungsten oxide, molybdenum hexacarbonyl, tungsten hexacarbonyl, ammonium tungstate, and molybdenum and tungsten materials convertible to the oxide on calcination and one of alumina- and silica-containing supports, and (c) said bis(cycloalkenyl)-substituted olefins have the formula

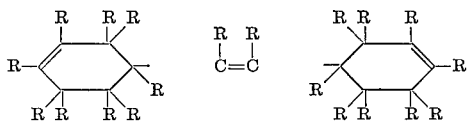

wherein R has at least one member selected from the group consisting of hydrogen and alkyl-containing radicals having from 1 to 10 carbon atoms.

11. The process of claim 1 wherein said alkenyl-substituted cycloalkene is 4-vinylcyclohexene, said disproportionation catalyst is molybdenum oxide, and said bis(cycloalkenyl)-substituted olefin is 1,2-bis(3-cyclohexene-1-yl)ethylene.

References Cited

UNITED STATES PATENTS

| 3,463,828 | 8/1969 | Crain | 260—666A |
| 3,395,189 | 7/1968 | Kubicek et al. | 260—666A |
| 3,395,190 | 7/1968 | Tabler | 260—666A |
| 3,413,355 | 11/1968 | Louthan | 260—666A |
| 3,342,884 | 9/1967 | Solomon | 260—666A |

DELBERT E. GANTZ, Primary Examiner

V. O'KEEFE, Assistant Examiner

UNITED STATES PATENT OFFICE

CERTIFICATE OF CORRECTION

Patent No. 3,567,789   Roy C. Harrison   Dated: March 2, 197[1]

It is certified that error appears in the above-identified patent and that Letters Patent are hereby corrected as shown below:

Column 1, line 47, "one embodiment" should be --- two embodiments ---; 3, line 13, "has" should be --- is ---; column 4, line 32, "which" should be -- column 5, line 68, "bis(cycloalkenyl)substituted" should be --- bis(cycloalkeny stituted ---; column 6, line 3, delete "one of"; column 6, line 3, "zones" shou --- zone ---; column 6, line 3, after "(2)" insert --- to ---; column 6, line 4 "form" insert --- a ---; column 6, line 6, "(3) or" should be --- or (3) ---; c 6, line 38, after "wherein" (first occurrence) insert --- one and only ---; col line 38, "-CH"CH$_2$" should be --- -$\overset{H}{C}$=CH$_2$ ---; column 6, line 47, after "of" inse the ---.

Signed and sealed this 22nd day of February 1972.

(SEAL)
Attest:

EDWARD M. FLETCHER, JR.          ROBERT GOTTSCHALK
Attesting Officer                Commissioner of Patents